United States Patent [19]

Kellerman

[11] 4,138,685

[45] Feb. 6, 1979

[54] RECORDING WITH IMAGEWISE ALTERATION OF MAGNETIC ATTRACTION OF DONOR

[75] Inventor: Richard Kellerman, Webster, N.Y.

[73] Assignee: Xerox Corporation, Stamford, Conn.

[21] Appl. No.: 804,691

[22] Filed: Jun. 8, 1977

[51] Int. Cl.² .......................................... G01D 19/00
[52] U.S. Cl. ..................................... 346/74.1; 360/59
[58] Field of Search ...................... 346/74.1, 153, 165; 360/59

[56] References Cited

U.S. PATENT DOCUMENTS

| | | | |
|---|---|---|---|
| 3,257,222 | 6/1966 | Carlson | 346/153 |
| 3,693,183 | 9/1972 | Lemke | 346/74.1 |
| 3,781,905 | 12/1973 | Bernal | 360/59 |
| 3,824,601 | 7/1974 | Garland | 346/74.1 |
| 4,030,105 | 6/1977 | Neukermans | 346/74.1 |
| 4,032,923 | 6/1977 | Pond | 346/74.1 |
| 4,038,665 | 7/1977 | Neukermans | 346/74.1 |
| 4,074,276 | 2/1978 | Haas et al. | 346/74.1 |

OTHER PUBLICATIONS

Journal of Applied Physics, pp. 1763–1768, vol. 42, No. 4, Mar. 1971, CrO hd 2 Based Thermomagnetic Information Storage and Retrieval Systems — R. K. Waring, Jr.

Primary Examiner—Jay P. Lucas

[57] ABSTRACT

A method for marking a recording surface includes providing a premagnetized magnetic donor layer having magnetically held on its surface magnetically attractable marking particles. The magnetic attraction between the marking particles and the donor layer is changed in selected areas of the donor layer so that the particles held in the selected areas are attracted to the recording surface by a magnetic field.

23 Claims, 4 Drawing Figures

RECORDING WITH IMAGEWISE ALTERATION OF MAGNETIC ATTRACTION OF DONOR

BACKGROUND OF THE INVENTION

This invention relates generally to marking a recording surface and more particularly to marking the surface with magnetically attractable particles.

The development of latent magnetic images using magnetically attractable marking particles is known. Typically, a latent magnetic image is formed in a magnetizable layer and is developed by contacting the layer with magnetically attractable marking particles.

The image can be formed by a variety of methods. For example, the layer can be uniformly magnetized and then imagewise heated to a temperature above its Curie point. The heated areas lose their magnetic properties when the Curie point temperature is reached. A latent magnetic image is left behind in the areas not heated.

In another method, magnetic toner particles are xerographically arranged to form an image. The magnetic toner image is brought into contact with a magnetizable layer. The toner magnetizes the layer in an image configuration to form a latent magnetic image.

Magnetic recording heads can also be used to form latent magnetic images. The recording heads can be used as styli.

These and other well known methods of forming and using latent magnetic images are found in U.S. Pat. Nos. 3,749,833 and 3,804,511 to Rait et al.; U.S. Pat. No. 3,472,695 to Kaufer et al.; U.S. Pat. No. 3,611,415 to Nelson; U.S. Pat. No. 3,368,209 to McGlauchlin et al.; U.S. Pat. 3,250,636 to Wilferth; U.S. Pat. No. 3,526,191 to Silverberg et al.; and U.S. Pat. No. 3,185,777 to Rheinfrank.

The development of latent magnetic images with magnetically attractable particles produces images of high quality. However, a marking method and apparatus which avoids the need to create and develop a latent magnetic image is desirable.

It is also known to provide a ribbon coated with heat sensitive material and to impinge the ribbon with laser light on the non-coated side so that the heat of the impinging laser light rapidly vaporizes the heat sensitive material adjacent to the ribbon. The rapid vaporization propels some of the marking material from the ribbon to a marking surface. Images can be produced by this method on the marking surface by using a modulated scanning laser.

This marking method, generally referred to as laser induced flash transfer, is very useful. However, it requires a disposable ribbon and a large energy input. An imaging method and apparatus which avoid the use of a disposable ribbon and which require less writing energy are desirable.

PRIOR ART STATEMENT

The following list is provided in compliance with 37 CFR 1.56 and is believed to be the closest prior art relating to the invention described below.

1. U.S. Pat. No. 3,472,695 to H. Kaufer et al. relates to a method for forming a latent magnetic image by heating image and non-image areas of a magnetizable surface to different temperatures. The latent magnetic image is developed with a magnetically attractable toner. See column 2, lines 30-35, and column 4, lines 42-47.

2. U.S. Pat. No. 3,368,209 discloses Curie point writing with a laser to store information in a magnetic surface. See column 1, lines 10-20.

3. U.S. Pat. No. 3,611,415 discusses the cooperation of a focused beam of light and a magnet to form a latent magnetic image in a belt by Curie point writing. The belt is subsequently developed by well known magnetic imaging means. See the Abstract, column 1, lines 67-73; column 2, lines 40-42; and column 5, lines 68 to column 6, line 55.

SUMMARY OF THE INVENTION

It is, therefore, an object of the present invention to overcome the disadvantages of the prior art.

It is also an object of the present invention to furnish a method and apparatus for marking a recording surface.

It is also an object of the present invention to supply a method and apparatus for marking a recording surface with magnetically attractable marking particles.

It is a further object of the present invention to disclose a method and apparatus for marking a recording surface which prod ces marks of high resolution with low background.

It is also an objec of the present invention to present a marking method and apparatus which marks with magnetically attrac able marking particles while avoiding the use of latent magnetic images.

It is yet another object of the present invention to present a marking method and apparatus which employs a reusable donor layer.

These and other objects are achieved, generally speaking, by a method which comprises the steps of providing a premagnetized donor layer having magnetically held thereon magnetically attractable marking particles and changing the magnetic attraction between the particles and selected areas of the donor layer. The marking particles are attracted from the selected areas of the donor layer into marking contact with the recording surface by a magnetic field.

The altering of magnetic properties in selected areas of the donor layer can be by Curie point erasure or by anhysteretic stylus writing. Curie point erasure is typically accomplished by such techniques as scanning with a modulated laser or writing with an array of heat styli.

In the Curie point erasure method, the donor layer can be heat biased prior to the step of altering the magnetic properties of selected areas. Heat-biasing is heating the donor layer to a temperature below its Curie point temperature. Such heat-biasing reduces the amount of imaging energy required to bring the donor layer to a temperature above its Curie point temperature when marking is desired.

The recording surface can also be heated to enable fixing when heat softenable marking particles come into marking contact with the surface. Marking particles can be selected to comprise heat softenable materials, such as thermoplastics, impregnated with magnetically attractable materials, such as ferromagnetics. Such marking particles are well known in the art and are commercially available.

When the heat softenable marking particle is attracted to the heated recording surface, it softens and is fixed to the recording surface. Heat fixing of thermoplastic toners to recording surfaces such as paper is well known in such arts as xerography.

The apparatus for performing the method comprises, generally speaking, a premagnetized donor layer positioned on one side of the recording surface, the layer having a coating of magnetically attractable marking particles magnetically held on its surface closest to the recording surface. The apparatus further includes a means for altering the magnetic properties in selected areas of the donor layer and a means for creating a magnetic field which attracts the marking particles from the selected areas of the donor layer into marking contact with the recording surface. The means for creating a magnetic field is positioned on the opposite side of the recording surface from the donor layer.

The donor layer can be an endless belt which moves in sequence to a means for premagnetizing the belt, a means for coating the magnetized belt with magnetically attractable particles and a station where the magnetic properties in selected areas of the belt are changed so the toner particles are drawn from the selected areas to the recording surface by a means for creating a magnetic field.

In preferred embodiments, the apparatus includes a heating means for thermally biasing the belt and a means for heating the recording surface to enable thermal fixing of heat softenable marking particles thereto.

In a preferred embodiment the means for creating a magnetic field is an electromagnet positioned to focus the particles as they are drawn from the donor layer to the receiving surface.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DETAILED DESCRIPTION

Figure 1:
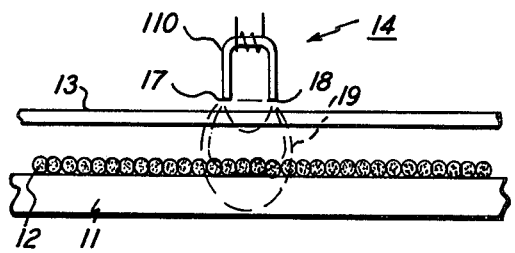
FIG. 1 shows schematically and in cross-section the magnetic field means, recording surface and toner coated donor layer of the present invention.

Referring more specifically to FIG. 1, there is shown a useful arrangement of the component parts of the present invention.

Donor layer 11 supports magnetically attractable toner particles 12. Layer 11 is a premagnetized magnetizable layer. It holds particles 12 on its surface by magnetic attraction.

Recording surface 13 is positioned adjacent layer 11, and magnetic field means 14 is positioned adjacent surface 13 on the side opposite layer 11.

Layer 11 may be any useful magnetizable layer. Suitable layers include magnetizable metal films such as iron powder held in a binder, magnetic oxides held in a binder, or any other suitably magnetically retentive material. More typically, however, layer 11 is $CrO_2$ coated onto a flexible film such as Mylar, a polyester. Other useful films are formed from materials such as regenerated cellulose, cellulosic esters and ethers and other cellulosic components as well as from synthetic resins such as polystyrene, polyesters, polyethylene and the like. Such coated films are readily available commercially and have highly desirable magnetic properties.

Marking particles 12 can be any suitable magnetically attractable particles. Typically, the particles comprise a binder impregnated with magnetically attractable material. The binder can be any material suitable for holding together the magnetically attractable particles.

Typically, such suitable binder materials are organic resins. Examples of suitable binder materials of this type are phenol-formaldehyde resins, rosin-modified phenol-formaldehyde and maleic glyceride resins, polystyrene and butadiene-styrene copolymers, asphalts such as gilsonite, manjak and asphaltite, calcium lactate, rosin, chlorinated rubber, glycol and glyceryl esters of hydrogenated rosin, polystyren resin, Pliofilm (rubber hydrochloride), polyvinyl butyral, copolymerized vinyl chloride and vinyl acetate resins, other vinyl resins, alkyd resins, acrylic resins and the like. These materials can be used as binders either singly or mixed together as desired, and may be mixed together by dissolving in a solvent or by milling or mixing in a conventional rubber mill or other compounding machinery.

Suitable magnetically attractable materials for the purposes of this invention are magnetic iron and its alloys, such as nickel-iron alloys, nickel-cobalt-iron alloys, and magnetic oxides, such as hematite ($\gamma Fe_2O_3$) and magnetite ($Fe_3O_4$) and ferrimagnetic ferrites. Cobalt and its alloys are also useful, such as, for example, aluminum-nickel-cobalt, copper-nickel-cobalt, and cobalt-platinum-manganese alloys. Moreover, other alloys, such as certain magnetic alloys of aluminum, silver, copper, magnesium and manganese can likewise be used with satisfactory results. These materials can be added singly or in mixtures to the binder material.

The marking particle can also be made entirely from magnetic materials for use in applications where fixing of the particle to the recording surface is not important. However, such applications are not frequently encountered.

The size of useful marking particle 12 varies depending on the resolution desired in the developed image. Generally speaking, any suitable marking particle size can be used. It is typical to encounter marking particles having an average diameter of from about 1 micron to about 30 microns. Particle sizes over about 30 microns product images which are generally considered undesirably rough and lacking in resolution. However, larger particles can be used whenever image resolution is not an important consideration.

Particles smaller than about 1 micron generally do not produce further image improvement which can be recognized by the naked eye. Such small particles sometimes become airborn and form undesirable coatings on surrounding surfaces.

The magnetically attractable particles can be readily prepared by first finely dividing or crushing the binder material, after which it is mixed with the magnetic material. The mixed binder and magnetic powders are melted and stirred to thoroughly disperse the magnetic powder in the binder. The mass is then permitted to cool, and preferably is mixed in a rubber mill where the heated rollers assure sufficient plasticity to blend the components thoroughly, after which it is broken into small chunks and again subdivided. It is then micronized and sieved to size. Obviously other methods can readily be devised by those skilled in the art.

Recording surface 13 can be any suitable surface which is sought to be marked. The surface should be permeable to magnetic force. It can be chosen so as to be suitable for permanent marking with the marking particles fixed to its surface. Typically, the recording surface is a flexible sheet such as plastic or paper.

Magnetic field means 14 can be any suitable type of magnet arrangement for exerting an attractive force on particles 12 through recording surface 13. Means 14 is chosen to exert a force on particles 12 sufficient to draw the particles to recording surface 13 in the absence of an attractive force exerted on the particles by donor layer 11. The force exerted by means 14 should not be strong enough to overcome the force exerted by donor layer 11 before the attractive force between layer 11 and particles 12 is changed (see FIG. 2).

A preferred magnet is shown in FIG. 1 and comprises an electromagnet 110. Faces 17 and 18 of the magnet extend substantially across the width of surface 13. This arrangement results in magnetic flux lines 19. Particles 12 travel transverse to flux lines 19 and are focused as the are drawn to surface 13 (see FIG. 2).

Figure 2:
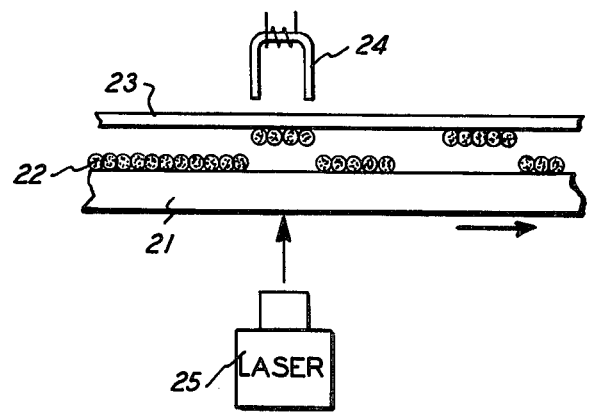
FIG. 2 shows schematically and in cross-section the present invention wherein marking is accomplished responsive to laser radiation.

Referring now to FIG. 2, the marking of recording surface 23 by particles 22 is shown. Prior to marking, magnetically attractable toner particles 22 are held to premagnetized donor layer 21. Surface 23 and layer 21 move in the direction shown by the arrow between magnetic field means 24 and writing laser 25.

At selected locations on layer 21, its magnetic properties are changed by laser 25. In those selected areas, means 24 draws particles 22 into marking contact with surface 23. Laser 25 can be controlled by any suitable one of the well known input means such as remote optical scanners and computer output devices.

Laser 25 changes the ferromagnetic properties of premagnetized donor layer 21 by Curie point erasure. Curie point erasure is a well known technique by which the magnetic properties of a material are altered by raising the temperature of the material to a critical temperature. The critical temperature varies between magnetizable materials and is known as the Curie point temperature of a material. For example, the Curie point temperature of $CrO_2$, a useful material for donor layer 21, is about 120° C.

Figure 3:
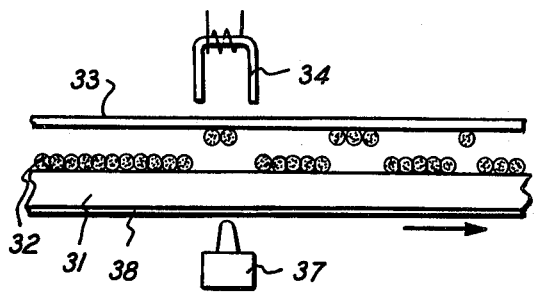
FIG. 3 shows schematically and in cross-section the present invention wherein marking is accomplished responsive to activation of a styli array.

Referring now to FIG. 3, there is shown an alternative embodiment of the invention in which the magnetic properties in selected areas of donor layer 31 are changed by a heating styli 37. Suitable pin-type heating styli 37 are well known and can be controlled by the same input as laser 25 of FIG. 2.

The embodiment of FIG. 3 operates in the same sequence as the embodiment of FIG. 2 except for the variation in the means for changing magnetic properties from selected areas of donor layer 31. Magnetic field means 34 is similar to that described in connection with FIGS. 1 and 2.

Donor layer 31 in FIG. 3 includes a heat transfer layer 38 which aids layer 31 in absorbing heat. Heat transfer layer 38 can be any material which increases the efficiency of layer 31 in absorbing heat. Typically, layer 38 is a coating of black paint or the like. It is to be understood that layer 38 can be used with equally good results in connection with laser heat sources such as that shown in FIG. 2.

In yet another alternative embodiment, stylus 37 can be an anhysteretic stylus. The anhysteretic stylus alters the magnetic properties of selected areas of donor layer 31 by disrupting the orderly molecular arrangement of the premagnetized layer.

Stylus 37 is representative of an array of styli which may be used together to alter the magnetic properties of layer 31 in a line across its surface. The line "written" by a styli array is generally perpendicular to the direction of movement of layer 31 past stylus 37 as shown by the arrow. A stylus array is useful whether stylus 37 is a heating stylus or an anhysteretic stylus.

Figure 4:
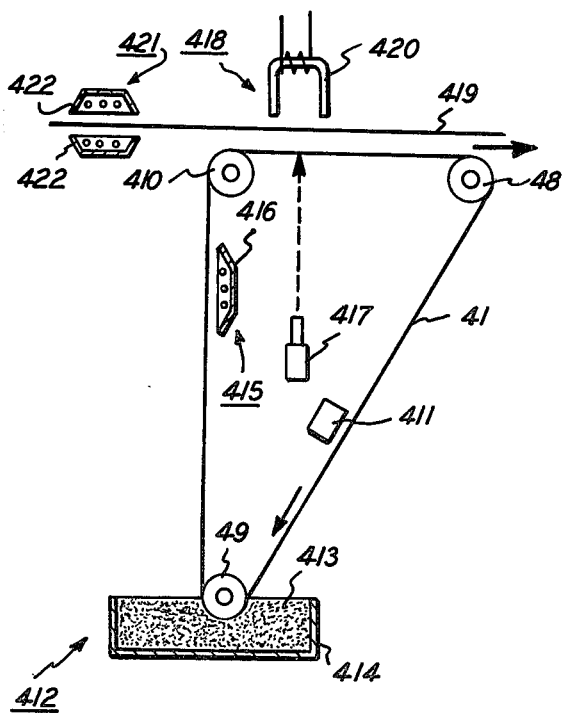
FIG. 4 shows schematically and in cross-section a preferred embodiment of the present invention adapted for cyclic reuse of the donor layer.

Referring now to FIG. 4, there is shown an apparatus for marking a recording surface by the method of the present invention. The donor layer of FIG. 4 is an endless belt 41 which moves in a closed loop around rollers 48, 49 and 410, one of which is a driving roller.

As belt 41 moves in the direction shown by the arrow, it passes magnetizing means 411 which premagnetizes the belt. Magnetizing means 411 can be any suitable such means. An AC driven magnetic recording head is a typical example of the useful magnetizing means.

Premagnetized belt 41 then moves to toner station 412 where magnetically attractable toner particles, such as those described in connection with FIG. 1, are applied to the belt. In the embodiment of FIG. 4, particles 413 are held in container 414. The particles are picked up by belt 41 as the belt passes through the supply of marking particles 413. Particles 413 substantially uniformly coat belt 41 responsive to the premagnetization provided by magnetizing means 411.

Belt 41 next moves to heat biasing station 415 which, in this embodiment, comprises heating element 416 positioned on one side of belt 41. Heating elements 416 elevate the temperature of belt 41, but do not elevate it to its Curie point temperature or to the softening temperature of particles 413.

The purpose of heat biasing is to reduce the amount of energy required of writing laster 417 to elevate the temperature of belt 41 to the Curie point. Heat biasing is advantageous in that it enables the use of a smaller, less expensive laser which consumes less energy. An additional advantage of heat biasing is that the life of belt 41 is prolonged. An energy input of about 0.3 Joules/cm$^2$ is normally required to elevate belt 41 from room temperature (about 20° C) to the Curie point temperature (about 120° C). However, thermal biasing can reduce the energy requirement to about 0.09 Joules/cm$^2$ when the belt is heat biased to about 110° C. An energy input of 0.3 Joules/cm$^2$ in a short period of time is found to break down the binder holding the magnetizable particles on belt 41. However, an energy input of 0.09 Joules/cm$^2$ is observed not to have the same deleterious effect.

It is to be understood that heat biasing of belt 41 is optional and is not to be considered a required part of the apparatus.

After belt 41 is heated at thermal biasing station 415, it moves to imaging station 418. Recording surface 419 is positioned between belt 41 and magnetic field means 420 at station 418. As discussed above, recording surface 419 can be any useful surface, and is typically paper.

Surface 419 is heated at heating station 421 just prior to being moved to imaging station 418. Heating is by heating elements 422 in the embodiment of FIG. 4; however, heating could be accomplished by any of a wide variety of heating means. Typical of such useful heating means are Xenon flash lamps and fuser means well known in the xerographic arts.

The purpose of heating recording surface 419 is to aid fixing of the marking particles to the surface as they strike it. Such a fixing technique is useful when particles 413 are made of heat softenable materials impregnated with magnetically attractable materials. Upon contact with the heated recording surface, the particles become tacky and adhere to the surface. Continued contact can cause them to become even less viscous so that they are absorbed by the fibers of the recording surface as an ink.

It is also possible to fix particles 413 to surface 419 by heat fusing after imaging station 418 or be spraying surface 419 with a lacquer after station 419. However, such post imaging fusing allows for some movement of particles 413 or surface 419 prior to fusing and is less desirable.

Imaging station 418 functions substantially as described in connection with FIG. 2. Modulated light from laser 417 heats selected areas of belt 41 to at least its Curie point temperature. It these selected areas, the magnetic properties of belt 41 are altered. Particles 413 are released from the selected areas to be drawn to recording surface 419 by means 420.

Means 420 of FIG. 4 is described in greater detail in connection with FIG. 1.

Laser 417 could be substituted with an array of heating styli or anhysteretic styli as explained in connection with FIG. 3.

Certain aspects of the invention are described below in greater detail by way of examples.

EXAMPLE I

A 7 cm. × 45 cm. strip of DuPont Crolyn $CrO_2$ magnetic tape is uniformly magnetized by passing it across an AC driven magnetic recording head. The premagnetized tape is wiped across a pile of A-09 toner particles (a magnetically attractable material having an average particle size of about 19 microns, available from the 3M Co. ). The toner particles substantially uniformly coat the Crolyn tape.

The coated tape is positioned parallel to a sheet of white, 20 lb. bond paper with the toner coated side facing the paper. The tape and paper are placed between an electromagnet (substantially as described in connection with FIG. 1) and a laser so that an arrangement substantially as shown in FIG. 2 is achieved. That is, the electromagnet is positioned behind the paper while the laser is positioned so as to strike the tape with a laser beam directly across from the magnet.

The laser is a Spectraphysics Model No. 175 25w (CW) Argon ion laser controlled by a remote optical scanner. The scanner is set up to scan once, left-to-right, across a light and dark pattern at a slow speed (about 2.5 cm./sec.) for this demonstration.

The paper is coated with rubber cement and the scanner is switched on. As it scans the pattern, the paper and tape are moved together by hand from left to right between the laser and the electromagnet set.

The scanner causes the laser to emit a beam when the dark portion of the original image is observed. The beam is attenuated when a light portion of the original is observed. When the beam strikes the tape, a transfer of the particles to the rubber cement coated paper is observed. The rubber cement is a convenience for this experiment and holds the particles in place for observation.

The particles form a line of dark areas corresponding generally to the dark areas in the scan line. The dark areas on the paper do not exactly match the dark areas in the scan line because of the lack of synchronization between the speed of the scanner and that of the hand-moved paper and tape.

EXAMPLE II

A 10 cm. ×100 cm. strip of Crolyn Video Tape (available from DuPont) is formed into an endless belt by splicing the ends together using Scotch tape and a video tape splicing apparatus. The magnetizable surface of the tape is on the outer side of the closed loop formed by the belt.

Three support rollers are arranged on a laboratory breadboard substantially as rollers 48, 49 and 410 are arranged in FIG. 4. The roller corresponding to roller 48 of FIG. 4 is driven by a constant rate motor.

A paper web is positioned so as to move from a supply roll to a take-up roll and to pass within about 0.25 cm. of the belt surface. The take-up roll is driven by the same motor which drives the support roller. The paper web moves in contact with a heated fuser roll from a Xerox 7000 copier. The fuser roll is positioned substantially as heating station 421 of FIG. 4.

A recording head is positioned substantially as magnetizing means 411 of FIG. 4. A fusing heater from a Xerox 914 copier is positioned as thermal biasing means shown in FIG. 4.

A Korad KY2/AOQ NdYAG scanning laser is positioned as laser 417 of FIG. 4. The laser is rated at 1.5 W CW ($\lambda = 1.06$ microns). The laser is driven by a tape reader into which is placed at tape recording made by optically scanning a large black and white "x".

An electromagnet as described in FIG. 1 is positioned as magnet means 420 in FIG. 4, and a supply of A-09toner is held in a container substantially as shown in FIG. 4.

All of the components of the arrangement are switched on except the thermal biasing means. After 30 seconds of operation, the apparatus is switched off, and the paper is unrolled from the take-up roll for observation. Substantially no useful marking of the paper is observed.

The apparatus is again set into operation including the thermal biasing means. After 30 seconds of operation, the apparatus is stopped, and the take-up roll is unwound for observation. A well fused reproduction of the recorded "X" is observed. The reproduction is of high resolution.

The tape reader is adjusted to produce a signal of opposite mode from the tape signal and the apparatus is once again set into operation with the heat biasing means functioning. Observation of the take up roll after 30 seconds operation shows a black-for-white or "reverse" image of the "x."

It is clear from Example II that a lower powered laser can be used in this inventive process in combination with thermal biasing.

EXAMPLE III

The construction of Example II is modified by substituting a line array of heating styli for the scanning laser. The styli are adapted to be switched on and off by the tape reader.

The array is adapted from a Hewlett Packard Model 9820A Calculator.

The apparatus of Example III is operated as the apparatus of Example II and substantially the same results are observed.

EXAMPLE IV

The construction of Example II is modified by substituting a line array of anhysteretic styli for the laser. The styli are adapted to be controlled by the tape reader. The heat biasing means is removed.

The apparatus of Example IV is operated as is the apparatus of Example II. The apparatus of Example IV is observed to produce a well fused "X" of high resolution on all passes. It is apparent that thermal biasing is not as useful in assisting anhysteretic erasure as it is in aiding Curie point erasure.

The above description, examples and drawings will be sufficient to enable one skilled in the art to make and use the present invention and to distinguish it from other inventions and from what is old. It will be appreciated that other variations and modifications will occur to those skilled in the art upon reading the present disclosure. These are intended to be within the scope of this invention.

What is claimed is:

1. A method for marking a recording surface, which comprises the steps of:
    (a) providing a substantially uniformly premagnetized donor layer having magnetically held thereon a substantially uniform coating of magnetically attractable marking particles;
    (b) altering the magnetic properties in selected areas of the donor layer in image configuration so that the particles held on the altered areas of the donor layer may be attracted into marking contact with the recording surface by a magnetic field; and
    (c) applying a magnetic field to attract the marking particles from the altered areas of the donor layer to the recording surface.

2. The method of claim 1 wherein altering the magnetic properties in selected areas of the donor layer is by heating the selected areas to at least the Curie point temperature of the layer.

3. The method of claim 2 wherein the heating is accomplished by impinging the layer with laser light in the selected areas.

4. The method of claim 2 wherein the heating is accomplished by activating selected ones of an array of heating styli positioned adjacent to the side of the layer.

5. The method of claim 2 including the additional step of uniformly pre-heating the donor layer to a temperature less than the Curie point temperature of the layer prior to the altering step.

6. The method of claim 1 wherein altering the magnetic properties in selected areas of the donor layer is effected by activating selected styli of an array of anhysterectic styli positioned adjacent the layer.

7. The method of claim 1 wherein heat softenable marking particles are used and including the additional step of heating the recording surface prior to the removing step to facilitate fixing of the particles to the recording surface.

8. The method of claim 1, including the additional subsequent step of remagnetizing the donor layer so that the layer can be reused.

9. The method of claim 1 wherein the magnetic field is created by an electromagnet positioned so as to cause focusing the particles as they are attracted into marking contact with the recording surface.

10. An apparatus for marking on a recording surface which comprises:
    (a) a member having a recording surface;
    (b) a donor layer having a magnetizable surface for carrying a substantially uniform layer of magnetically attractable marking particles;
    (c) means for premagnetizing the magnetizable surface of the donor layer;
    (d) means for uniformly applying a coating of magnetically attractable marking particles to the surface of the donor layer after it is premagnetized;
    (e) means for altering the magnetic properties of selected areas of the donor layer in image configuration; and
    (f) magnetic field means positioned on the side of the donor layer opposite the donor layer surface facing the recording surface for attracting the marking particles from the selected areas of the donor layer into marking contact with the recording surface.

11. The apparatus of claim 10 wherein the marking particles have a diameter of from about 1 micron to about 30 microns.

12. The apparatus of claim 10 wherein the means for premagnetizing the donor layer is an AC driven recording head.

13. The apparatus of claim 10 further including a means for heating the recording surface to a temperature sufficient to fix heat-softenable marking particles to it.

14. The apparatus of claim 10 wherein the means for altering magnetic properties in selected areas of the donor layer is a Curie point erasure means.

15. The apparatus of claim 14 wherein the Curie point erasure means is a scanning laser positioned so as to scan the donor layer on the side opposite the magnet means.

16. The apparatus of claim 14 wherein the Curie point erasure means is an array of heating styli.

17. The apparatus of claim 14 further including a thermal biasing means for heating the donor layer to a temperature below its Curie point temperature.

18. The apparatus of claim 14 wherein the donor layer includes a heat transfer layer on the side opposite the surface facing the recording surface.

19. The apparatus of claim 10 wherein the means for altering magnetic properties in selected areas of the donor layer is an anhysteretic styli array.

20. The apparatus of claim 10, wherein the magnetic field means is an electromagnet positioned so as to cause focusing of the particles as they are attracted to the recording surface.

21. The apparatus of claim 10 further including a means for uniformly applying marking particles to the surface of the donor layer after it is premagnetized.

22. The apparatus of claim 10 wherein the donor layer is an endless belt which is adapted to move in sequence to the means for premagnetizing the donor layer, the means for applying magnetically attractable marking particles to the surface of the donor layer, and means for altering the magnetic properties in selected areas of the donor layer.

23. The apparatus of claim 22 wherein the endless belt also moves to a thermal biasing means prior to the means for removing.

* * * * *